United States Patent
Hou et al.

(10) Patent No.: US 7,613,934 B2
(45) Date of Patent: Nov. 3, 2009

(54) METHOD AND APPARATUS FOR MONITORING THE POWER STATE OF COMPUTER SYSTEM

(75) Inventors: Yung-Hui Hou, Taipei Hsien (TW); Homg-Ji Shieh, Taipei Hsien (TW); Wei Lin, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 428 days.

(21) Appl. No.: 11/017,656

(22) Filed: Dec. 22, 2004

(65) Prior Publication Data
US 2005/0268184 A1    Dec. 1, 2005

(30) Foreign Application Priority Data
Apr. 13, 2004    (TW) ............................. 93110226 A

(51) Int. Cl.
*G06F 1/32* (2006.01)
*G08B 13/14* (2006.01)
(52) U.S. Cl. .................. 713/300; 713/310; 713/320; 713/321; 713/322; 713/323; 713/324; 713/330; 713/340; 340/541; 726/35
(58) Field of Classification Search ............ 713/300, 713/310, 320–324, 330, 340; 361/725; 340/541; 726/35
See application file for complete search history.

(56) References Cited

U.S. PATENT DOCUMENTS

| | | | | |
|---|---|---|---|---|
| 5,912,621 A * | 6/1999 | Schmidt | .................... | 340/571 |
| 6,489,890 B1 * | 12/2002 | Inoue | ..................... | 340/568.1 |
| 6,826,701 B1 * | 11/2004 | Plante | ........................ | 713/300 |
| 7,046,237 B1 * | 5/2006 | Nicolas et al. | ............... | 345/179 |
| 7,058,831 B2 * | 6/2006 | Cheok et al. | ................ | 713/320 |
| 7,096,299 B2 * | 8/2006 | Meynard | .................... | 710/304 |
| 2001/0047483 A1 * | 11/2001 | Kuo et al. | .................. | 713/200 |
| 2002/0059473 A1 * | 5/2002 | Oshins et al. | ............... | 709/321 |
| 2002/0069352 A1 * | 6/2002 | Fanning | ......................... | 713/1 |
| 2004/0150958 A1 * | 8/2004 | Calhoon | ..................... | 361/725 |
| 2004/0186988 A1 * | 9/2004 | Polyudov | .................... | 713/100 |

* cited by examiner

*Primary Examiner*—Thomas Lee
*Assistant Examiner*—Fahmida Rahman
(74) *Attorney, Agent, or Firm*—Pillsbury Winthrop Shaw Pittman, LLP

(57) ABSTRACT

A monitoring method and apparatus applied to a computer system having a computer case, a controller and a register for changing the power state of the computer system according to the assembling state of the computer case is disclosed. The method comprises steps of detecting whether the computer case of the computer system is disassembled, generating a trigger signal to the controller when the computer case of the computer system is disassembled, generating a power management signal in response to the trigger signal for changing a system power state indicator of the register, and polling the system power state indicator and driving the computer system into a hibernation mode according to the change of the system power state indicator.

15 Claims, 4 Drawing Sheets

METHOD AND APPARATUS FOR MONITORING THE POWER STATE OF COMPUTER SYSTEM

CROSS REFERENCE TO RELATED APPLICATIONS

This application claims the benefit of priority of Taiwanese Patent Application No. 093110226, filed in Taiwan on Apr. 13, 2004. The entire content of this application is incorporated herein by reference.

FIELD OF THE INVENTION

The present invention relates to a monitoring method and apparatus for regulating the power state of a computer system according to the assembling state of a computer case.

BACKGROUND OF THE INVENTION

With the advancement of science and technology, the popularity and development of computer system have gained a great achievement, and the evolvement of humanity enters into a new age. Thus, it is easily to observe people using the computer at home, office or public place. Accordingly, the Internet is also universally developed as well. The combination of computer and Internet brings more frequent and greater contacts between each Internet user and service providers. Therefore, the combination of computer system and computer network can be extensively applied to various technical or commercial services to bring illimitable potentials to human's life.

In general, the computer system employs a power management system to conserve power. On Dec. 22, 1996, Intel, Microsoft and Toshiba jointly established and published an ACPI (Advanced Configuration and Power Interface) standard, which integrates power management into the operating system to improve the efficiency of power management and accelerate the processing speed of computer system through a unified interface for controlling the power supply operation of all hardware.

According the definition of ACPI standard, the power management of computer system includes six modes, S0~S5, in which S0 is a normal operating mode; S1~S3 is power saving modes; S4 is a hibernation mode; and S5 is a power off mode. S1~S4 modes are slightly different with each other in the sense of power saving. S1 mode represents that the operation of the computer system can be quickly recovered and no system context is lost. S2 mode is similar to S1 mode, but the contents of CPU cache and system memory are lost, and after the computer system is recovered, the operating system needs to maintain the contents of CPU cache and system memory. S3 mode is a suspended-to-RAM mode, in which only RAM and the power management controller are powered on and the other hardware is in the off state when the computer system enters the S3 mode. Certainly, after entering the S3 mode, the operation data of the computer system are stored in RAM, and when returning to the normal operating mode, the computer system will quickly restore these data from RAM. S4 mode is a suspend-to-disk mode, in which when the computer system enters the S4 mode, BIOS selects a backup disk partition with the size being equivalent to a system partition to store subsequent operation data of the computer system, and when returning to the normal operating mode, the computer system will restore these data from the backup disk partition.

On the other hand, the computer system mainly includes a display, a computer host and other peripherals. The transmission between the computer host and the display is proceeded via the signal cable, and the other peripherals are electrically connected with the computer host. However, when a user is removing an important component of the computer system, such as a display card or CPU, he may not be aware whether the computer system is in a power off mode (S5) or a standby mode (S3). As a result, the destructions and damages of the computer system or important components will be inadvertently caused, since the computer system is not completely powered off while the important components therein are suddenly installed or removed.

To overcome the defects of the above-mentioned prior art and to ensure the computer system is correctly powered off in order to avoid damages as a result of user's incautious operation for the removal of the internal components, some components having the hot swappable function are provided on the market, so that the components can be removed while the computer system is not completely powered off. However, not all components of the computer system support the hot swappable function, and the production costs of the components having the hot swappable function are very high. Thus, it is a problem needing to be overcome for the company who wants to promote their market competition with lower production costs.

Therefore, it is needed to provide a method and apparatus for monitoring the power state of the computer system, which can overcome the defects of the above-mentioned prior art, and ensure that the computer system is in the S4 mode (suspend-to-disk mode) when the user is replacing the internal components of the computer system.

SUMMARY OF THE INVENTION

It is an object of the present invention to provide a monitoring method and apparatus for regulating the power state of the computer system according to the assembling state of the computer case, so as to remove the defect of the traditional computer system that the computer system or its important component is damaged due to the incautious power-off event when the user is replacing an important component.

To achieve the above-mentioned object, a monitoring method applied to a computer system having a computer case, a controller and a register for changing the power state of the computer system according to the assembling state of the computer case is disclosed. The method comprises steps of detecting whether the computer case of the computer system is disassembled; generating a trigger signal to the controller when the computer case of the computer system is disassembled; generating a power management signal in response to the trigger signal for changing a system power state indicator of the register; and driving the computer system into a hibernation mode according to the change of the system power state indicator.

In another embodiment, a monitoring method applied to a computer system having a computer case, a controller and a register and working in a power-saving mode is disclosed. The method comprises steps of detecting whether the computer case of the computer system is disassembled; generating a trigger signal to the controller when the computer case of the computer system is disassembled; generating a power management signal in response to the trigger signal for changing a system power state indicator of the register; changing the power state of the computer system from the power-saving mode into a normal operating mode; and driving the computer system from the normal operating mode into a hibernation mode according to the change of the system power state indicator.

To achieve the above-mentioned object, a monitoring apparatus applied to a computer system having a computer case for changing the power state of the computer system according to the assembling state of the computer case is further disclosed. The monitoring apparatus comprises a detecting component for detecting whether the computer case of the computer system is disassembled and generating a trigger signal when the computer case is disassembled; a controller electrically connected with the detecting component for generating a power management signal in response to the trigger signal; a register electrically connected with the controller and comprising a system power state indicator for indicating that the system power state of the computer system is to be changed in response to the power management signal; and a monitor system electrically connected with the register for polling the system power state indicator and driving the computer system into a hibernation mode according to the content of the system power state indicator.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a method for monitoring the power state of the computer system through the detection of whether the computer case is disassembled by a detecting component disposed on the outside surface of the computer case. When the computer case is disassembled, a trigger signal is generated to inform the internal circuit of the computer system, so that the computer system can enter S4 (suspend-to-disk) mode defined by the ACPI standard from its original power state; thus, the subsequent operation data of the computer system can be stored in the disk partition with the size being equivalent to a system partition so as to avoid data loss. When the user is removing a component of the computer system, since almost all components are in a power off state, the damage of the system or component can be eliminated during the installation or removal process, so that the user can replace the component under a safe condition.

Figure 1:
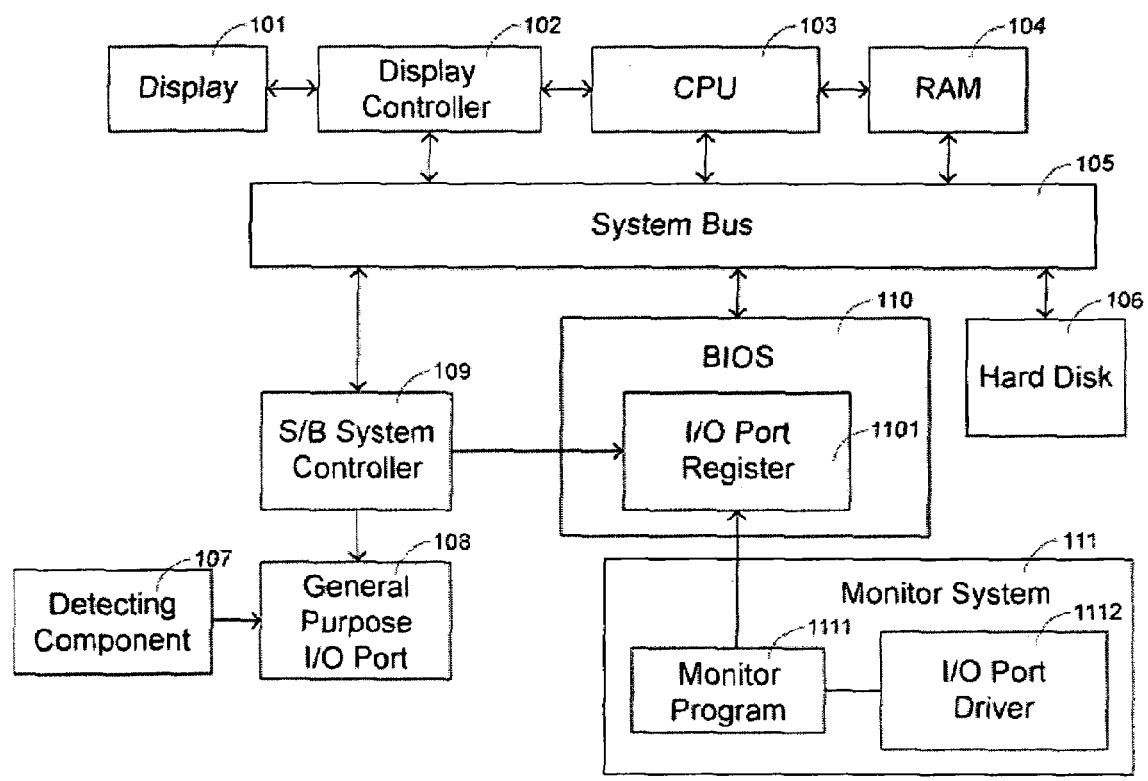
FIG. 1 is a block diagram of the circuit framework of the computer system used in the method for monitoring the power state of the computer system according to a preferred embodiment of the present invention.

Please refer to FIG. 1, which is a block diagram of the circuit framework of the computer system used in the method for monitoring the power state of the computer system according to a preferred embodiment of the present invention. As shown in FIG. 1, the computer system includes a display 101, a display controller 102, a CPU 103, a RAM 104, a system bus 105, a hard disk 106, a detecting component 107, a general-purpose I/O port 108, a controller 109, a BIOS 110, and a monitor system 111. Preferably, the controller 109 is a S/B (southbridge) system controller.

The detecting component 107 is electrically connected with the general-purpose I/O port 108 disposed on the main board (not shown) for dynamically detecting whether the lid (not shown) of the computer case is detached and generating a trigger signal to the S/B system controller 109 through the general-purpose I/O port 108 when the lid of the computer case is detached.

When the S/B system controller 109 receives the trigger signal generated by the detecting component 107, the state of an intrusion alarm data bit set in the S/B system controller 109 will be correspondingly changed according to the trigger signal, in order to generate a power management signal and transmit the power management signal to a register in the BIOS 110.

In this embodiment, the register is an I/O port register 1101 and includes a system power state indicator for storing the system power state that will be changed when the I/O port register 1101 receives the power management signal, which means the computer case of the computer system is disassembled and therefore the power state of the computer system is transformed into the S4 (suspend-to-disk mode) defined by the ACPI standard.

A monitor system 111 is loaded during the boot procedure of computer system for dynamically detecting whether the system power state indicator of the I/O port register 1101 is changed. The monitor system 111 includes a monitor program 1111 and an I/O port driver 1112, in which the I/O port driver 1112 enables the monitor program 1111 to poll the data of system power state indicator of the I/O port register 1101. The monitor program 1111 can dynamically detect the change of system power state indicator of the I/O port register 1101 for driving the computer system into S4 (suspend-to-disk) mode when the system power state indicator is changed. Therefore, the subsequent operation data of the computer system can be stored in the disk partition with the size being equivalent to a system partition so as to avoid data loss, and when the user is installing or removing a component of the computer system, the damage of the system or component can be eliminated.

As to the display 101, display controller 102, CPU 103, RAM 104, system bus 105, and hard disk 106, since their circuit design principles and the functions are well known by one skilled in the art, they are not described here for simplicity.

Figure 2:
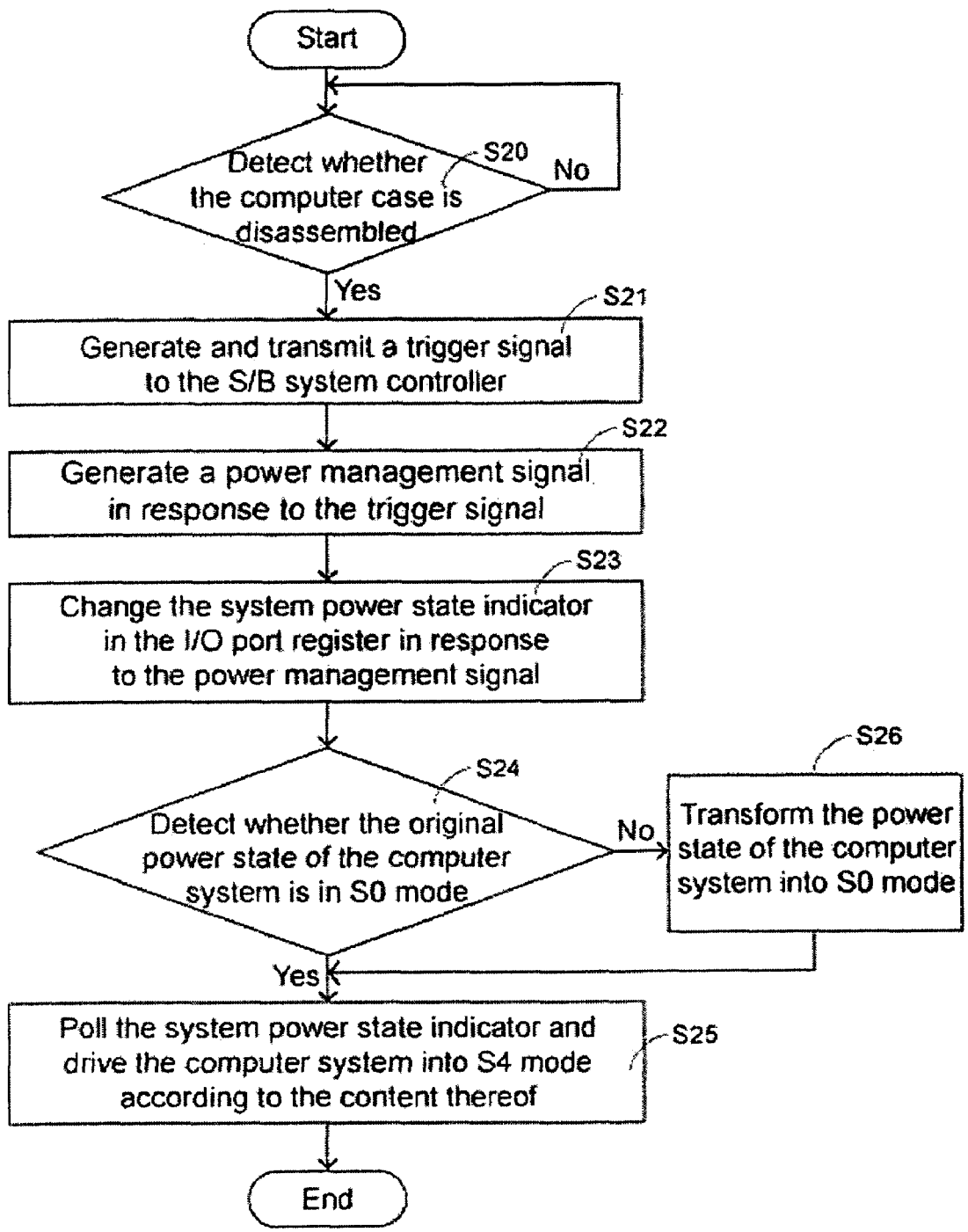
FIG. 2 is a flowchart of the method for monitoring the power state of the computer system according to a preferred embodiment of the present invention.

Please refer to FIG. 2, which shows a flowchart of the method for monitoring the power state of the computer system according to a preferred embodiment of the present invention. First, the determination of whether the detachable lid of the computer case of the computer system is detached (step S20) is made by the detecting component 107. If the lid of the computer case is detached, a trigger signal is generated and transmitted through the general-purpose I/O port 108 to the S/B system controller 109 (step S21). Then the intrusion alarm data bit in the S/B system controller 109 is correspondingly changed according to the trigger signal to generate a power management signal and transmit the power management signal to the I/O port register 1101 in the BIOS 110 (step S22). Afterward, the content of the system power state indicator stored in the I/O port register 1101 is changed in response to the power management signal, which means the power state of the computer system needs to be transformed into the S4 (suspend-to-disk) mode (step S23).

Since the power state of the computer system might be S0 (normal operating mode) or one of the power-saving modes (S1, S2 and S3 mode), when the computer case is disassembled by the user, the method of the present embodiment continues with the next step of detecting whether the original power state of the computer system is in S0 mode or not by BIOS (step S24).

When the original power state of the computer system is in S0 (normal operating mode), the monitor program 1111 polls the system power state indicator of the I/O port register 101 and drives the computer system from S0 mode into S4 (suspend-to-disk) mode according to the content thereof (step S25) for storing the subsequent operation data of the computer system in the disk partition with the size being equivalent to the system partition to avoid data loss.

When the original power state of the computer system is in one of the power-saving mode, for example, S3 mode, the related devices that are turned off when entering the S3 mode, such as CPU, RAM controller, chipset or cache, are awaken by the BIOS 110. (step S26) Then the monitor program 1111 polls the system power state indicator of the I/O port register 1101 and drives the computer system from S0 mode into S4 (suspend-to-disk) mode according to the content thereof (step S25) for storing the subsequent operation data of the computer system in the disk partition with the size being equivalent to the system partition to avoid data loss.

Therefore, it can be ensured that when the user is removing the important component of the computer system, the computer system is forced to stay in the S4 mode to avoid data loss, and since almost all components are in power off state, the damage of the computer system or component can be eliminated during the installation or removal process.

Figure 3A:
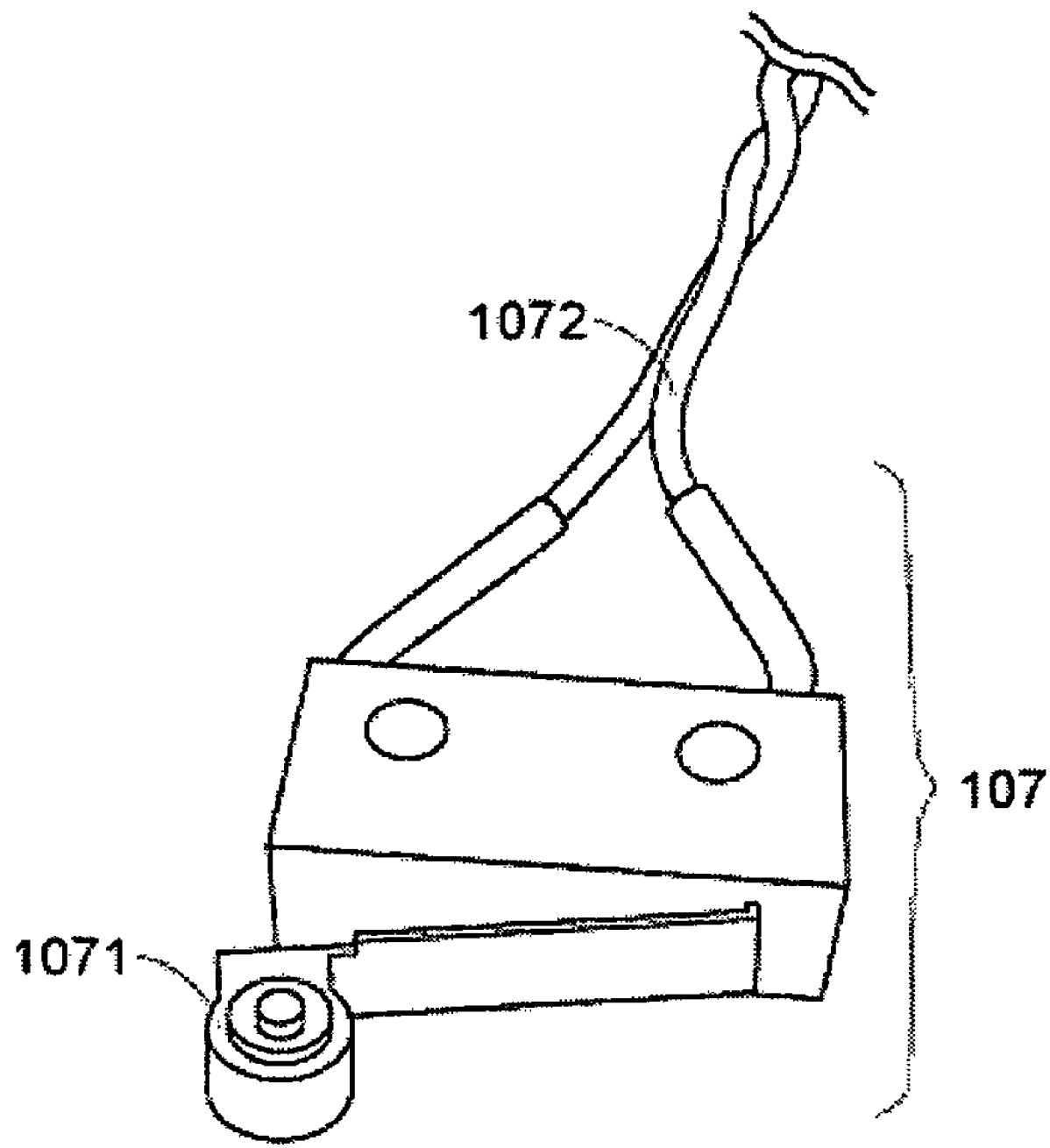
FIG. 3(a) is a schematic view showing the detecting component according to a preferred embodiment of the present invention.
Figure 3B:
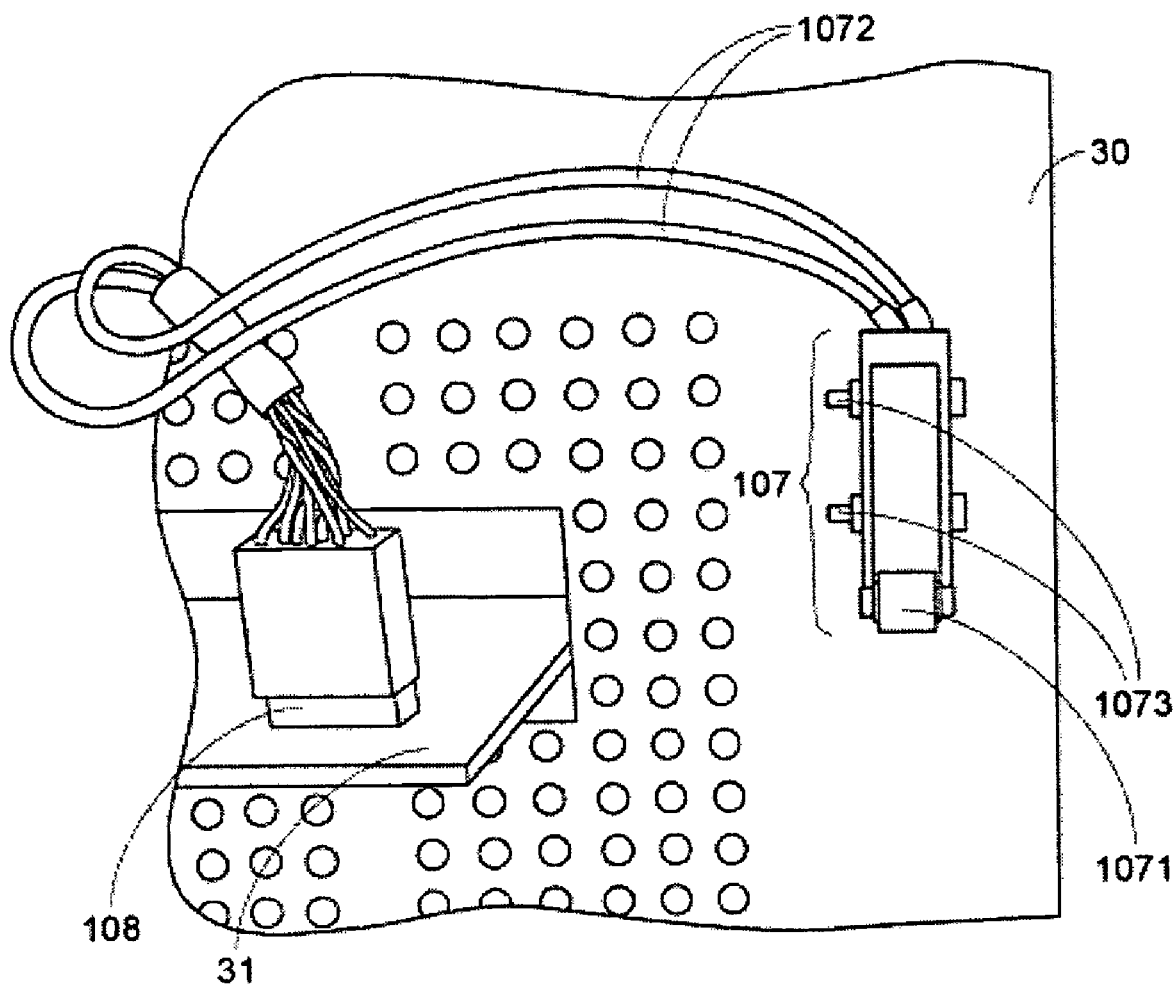
FIG. 3(b) is a schematic view showing the detecting component of FIG. 3(a) disposed on the computer case according to a preferred embodiment of the present invention.

Please refer to FIG. 3(a), which is a schematic view showing the detecting component according to a preferred embodiment of the present invention. In this embodiment, the detecting component 107 is a switch component having a roll structure 1071 and is fixedly mounted on the outside surface of the computer case 30 via a plurality of screws 1073 (as shown in FIG. 3(b)). When the lid of the computer case 30 is not detached, the roll structure 1071 of the detecting component 107 is configured to lean against the lid of the computer case 30. When the lid of the computer case 30 is detached, the roll structure 1071 of the detecting component 107 does not lean against the lid of the computer case 30, and therefore it is determined that the lid cover of the computer case 30 is detached so as to further generate the trigger signal.

The detecting component 107 has transmission lines 1072 to be electrically connected with the general-purpose I/O port 108 disposed on the main board 31 for transmitting the trigger signal to the S/B system controller 109.

Of course, the aforesaid detecting component 107 is merely an embodiment of the present invention, and its structure shall not be limited thereby. Instead, any detecting component which can be used to detect whether the lid of the computer case is detached can be applied in the present invention.

In conclusion, the method for monitoring the power state of the computer system provided in the present invention employs the detecting component to generate and transmit the trigger signal to the internal circuit of the computer system when the lid of the computer case is detached, so that the monitor program can detect that the power state of the computer system needs to be transformed into the S4 mode, and thus the subsequent operation data of the computer system can be stored in the disk partition with the size being equivalent to a system partition so as to avoid data loss, and the damage of the computer system or component can be eliminated during the installation or removal process.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A monitoring method for use in a computer system having a computer case, a controller and a register for changing a power state of said computer system according to the assembling state of said computer case, said method comprising:

detecting whether said computer case of said computer system is disassembled with a detecting component disposed on an outside surface of said computer case;

generating a trigger signal to said controller and detecting whether said computer system is in a normal operating mode power state when said computer case of said computer system is disassembled;

transforming said computer system into said normal operating mode power state when it is detected that said computer system is not in said normal operating mode power state and said computer case of said computer system is disassembled;

generating a power management signal in response to said trigger signal for changing a system power state indicator of said register; and polling said system power state indicator and driving said computer system from said normal operating mode power state into a hibernation mode according to the change of said system power state indicator, wherein the detecting component has a roll structure leaning against a cover of said computer case for mechanically detecting whether said computer case is disassembled.

2. The method according to claim 1, wherein said computer system further comprises a general-purpose I/O port for transmitting said trigger signal generated by said detecting component to said controller.

3. The method according to claim 1 wherein after changing said system power state indicator of said register, said method further comprises:

detecting said power state of said computer system, and polling said system power state indicator when said power state is in the normal operating mode.

4. The method according to claim 3 wherein said power state of said computer system is detected by BIOS.

5. The method according to claim 1 wherein said controller is a southbridge system controller having an intrusion alarm data bit whose state is correspondingly changed when said southbridge system controller receives said trigger signal so as to generate said power management signal.

6. The method according to claim 1 wherein said register is an I/O port register disposed in BIOS for storing said system power state indicator.

7. The method according to claim 1 wherein said hibernation mode is an S4 mode defined by the ACPI standard.

8. The method according to claim 1 wherein a monitor program and an I/O port driver are loaded during the boot procedure of said computer system, wherein said I/O port driver enables said monitor program to poll the data in said register and said monitor program dynamically detects the change of said system power state indicator of said register for driving said computer system into said hibernation mode when said system power state indicator is changed.

9. A monitoring apparatus for use in a computer system having a computer case for changing a power state of said computer system according to the assembling state of said computer case, said monitoring apparatus comprising:

a detecting component for detecting whether said computer case of said computer system is disassembled and generating a trigger signal when said computer case is disassembled, wherein said detecting component is disposed on an outside surface of said computer case and having a roll structure leaning against a cover of said computer case for mechanically detecting whether said computer case is disassembled;

a controller electrically connected with said detecting component for generating a power management signal in response to said trigger signal;

a register electrically connected with said controller and comprising a system power state indicator for indicating that said power state of said computer system is to be changed in response to said power management signal; and a monitor system electrically connected with said register for polling said system power state indicator and driving said computer system into a hibernation mode if said computer system is in a normal power mode, or driving said computer system into said normal power mode if it is not in said normal power mode prior to driving said computer system into said hibernation mode, according to the change of said system power state indicator.

10. The monitoring apparatus according to claim 9 further comprising a general-purpose I/O port electrically connected with said detecting component and said controller for transmitting said trigger signal generated by said detecting component to said controller.

11. The monitoring apparatus according to claim 9 further comprising a BIOS electrically connected with said controller for detecting said power state of said computer system, and polling said system power state indicator when said power state is in the normal power mode and changing said power state of said computer system from a power-saving mode to said normal mode when said power state is in the power-saving mode.

12. The monitoring apparatus according to claim 11 wherein said normal operating mode is an S0 normal mode, said power-saving mode is one of S1, S2 and S3 modes, and said hibernation mode is S4 mode defined by the ACPI standard.

13. The monitoring apparatus according to claim 11 wherein said register is an I/O port register disposed in said BIOS for storing said system power state indicator.

14. The monitoring apparatus according to claim 9 wherein said controller is a southbridge system controller having an intrusion alarm data bit whose state is correspondingly changed when said southbridge system controller receives said trigger signal so as to generate said power management signal.

15. The monitoring apparatus according to claim 9 wherein said monitor system is loaded during the boot procedure of the computer system and comprises a monitor program and an I/O port driver, wherein said I/O port driver enables said monitor program to poll the data in said system power state indicator of said register and said monitor program dynamically detects the change of said system power state indicator of said register for driving said computer system into said hibernation mode when said system power state indicator is changed.

* * * * *

UNITED STATES PATENT AND TRADEMARK OFFICE
CERTIFICATE OF CORRECTION

PATENT NO. : 7,613,934 B2  Page 1 of 1
APPLICATION NO. : 11/017656
DATED : November 3, 2009
INVENTOR(S) : Hou et al.

It is certified that error appears in the above-identified patent and that said Letters Patent is hereby corrected as shown below:

Title Page (75) Inventors:

"Homg-Ji Shieh, Taipei Hsien (TW)" should read

--Horng-Ji Shieh, Taipei Hsien (TW)--

Signed and Sealed this

Fifth Day of January, 2010

David J. Kappos
*Director of the United States Patent and Trademark Office*